US008302003B2

(12) United States Patent
Vasey

(10) Patent No.: US 8,302,003 B2
(45) Date of Patent: Oct. 30, 2012

(54) DYNAMIC QUESTIONNAIRE GENERATION

(75) Inventor: Philip E. Vasey, Histon (GB)

(73) Assignee: Business Integrity Limited, London (GB)

( * ) Notice: Subject to any disclaimer, the term of this patent is extended or adjusted under 35 U.S.C. 154(b) by 1614 days.

(21) Appl. No.: 10/932,266

(22) Filed: Sep. 2, 2004

(65) Prior Publication Data
US 2005/0050464 A1 Mar. 3, 2005

Related U.S. Application Data

(60) Provisional application No. 60/499,383, filed on Sep. 3, 2003.

(51) Int. Cl.
G06F 17/00 (2006.01)
G09B 3/00 (2006.01)
(52) U.S. Cl. .................... 715/273; 434/322
(58) Field of Classification Search .......... 715/500, 715/513, 234, 200, 273; 434/322
See application file for complete search history.

(56) References Cited

U.S. PATENT DOCUMENTS

| 5,978,820 | A * | 11/1999 | Mase et al. | 715/531 |
| 6,519,578 | B1 * | 2/2003 | Reddy | 706/45 |
| 7,069,506 | B2 * | 6/2006 | Rosenholtz et al. | 715/526 |
| 2002/0010709 | A1 * | 1/2002 | Culbert et al. | 707/500 |
| 2002/0026459 | A1 * | 2/2002 | Fernandez | 707/506 |
| 2002/0035486 | A1 * | 3/2002 | Huyn et al. | 705/3 |
| 2002/0091736 | A1 * | 7/2002 | Wall | 707/513 |
| 2002/0119433 | A1 * | 8/2002 | Callender | 434/322 |
| 2003/0142128 | A1 * | 7/2003 | Reulein et al. | 345/742 |
| 2003/0172343 | A1 * | 9/2003 | Leymaster et al. | 715/500 |
| 2004/0073868 | A1 * | 4/2004 | Easter et al. | 715/507 |

FOREIGN PATENT DOCUMENTS

| EP | 1329817 A1 | 7/2003 |
| WO | WO 03/038662 | 5/2003 |

OTHER PUBLICATIONS

Grutzner, Ines, et al, "Education and Training: A Systematic Approach to Produce Small Courseware Modules for Combined Learning and Knowledge Management Environments", Proceedings of the 14th International Conference on Software Engineering and Knowledge Engineering SEKE '02, Jul. 2002, pp. 533-539.*
Raven, Mary Elizabeth, et al, "Using Contextual Inquiry to Learn About Your Audiences", ACM SIGDOC Asterisk Journal of Computer Documentation, vol. 20, Issue 1, Feb. 1996, pp. 1-13.*
International Search Report for PCT/GB2004/003764.

* cited by examiner

Primary Examiner — Laurie Ries
(74) Attorney, Agent, or Firm — Anderson Gorecki & Manaras LLP

(57) ABSTRACT

The invention provides a document generation system for generating a customised document using a document generation program, having means to generate and information capture document for obtaining input information. At least one content element comprises at least a first variable. The system comprises means to evaluate a set of further rules including at least one second variable to determine the number and type of occurrences of the first variable, and means to aggregate the further set of rules to determine the relevance of the first variable in terms of the at least one second variable.

34 Claims, 4 Drawing Sheets

DYNAMIC QUESTIONNAIRE GENERATION

RELATED U.S. APPLICATIONS

This application claims the benefit of U.S. Provisional Application No. 60/499,383, filed 3 Sep. 2003.

FIELD OF THE INVENTION

The present invention relates to the automated creation of documents, and in particular to the dynamic generation of questionnaires to capture information used in the generation of such automated documents.

BACKGROUND TO THE INVENTION

It is well known to generate customised documents, either manually or using an automated system, from precedents or templates.

If this is done manually, then a printed standard form or other precedent, containing blank spaces for particular relevant information, will be filled in and edited on each specific occasion it is used. Instructions may be included in the standard document to help the user insert the correct or appropriate information.

If this is done using an automated system, then an electronically stored document or template will be used, in conjunction with various logical rules and other criteria, to prompt the user for the correct information and to assemble a customised document by associating various relevant rules with variables within the template. An example is the HotDocs® system which uses a library of Form Templates, which store both static and dynamic areas of text, that are initially customised by the user, in conjunction with a questionnaire to produce a completed customised document. Necessary information relevant to the dynamic text areas may either be input directly by a user, or gathered from an Answer File. The Answer File contains information which is repeatedly used in the same or similar customised document. Various logical rules and calculation criteria are used to associate information with the template to produce a final customised document. This document may then be edited, printed or stored.

Other known automated systems include that described in WO01/04772. In this system, a server computer runs a document generation program and is capable of communicating with local or remote client computers over a local area network (LAN) or a wide area network (WAN), such as the Internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

When information is captured, the transaction values entered by the user will be substituted for the various variables in the template. One difficulty in capturing such transaction values using web pages or web forms, is ensuring that the page or form prompts the user for the correct information. This is a particular problem when, in a series of related questions, some of the information needed is dependent on an answer to a previous question.

In particular, there will be occasions when some of the variables will be dependent on various transaction values, and the behaviour of these various transaction values will affect the behaviour of the dependent variables. In some circumstances, this dependency can cause questions to be enabled or disabled in the web page or form incorrectly.

The prior art approach to solving these problems is to hand encode a series of complex conditional statements, or to edit and re-edit code by hand each time a transaction value changes. This is time consuming and prone to error.

SUMMARY OF INVENTION

The invention provides a document generation system for generating a customised document using a document generation program, having means to generate an information capture document for obtaining information. At least one content element comprises at least a first variable. The system comprises means to evaluate a set of further rules that include at least one second variable to determine the types of occurrences of the first variable, and means to aggregate such rules to determine the relevance of the first variable in terms of the at least one second variable.

The type of each occurrence of the first variable is determined by whether the first variable occurs within unconditional text, within conditional text or as part of a usage statement that controls the inclusion of some conditional text.

The relevance of the first variable is determined by aggregating the types of occurrences together using a logical OR operation.

A web form questionnaire is used to capture information from a user. The information comprises transaction values which correspond to particular variables, for example, a first transaction value corresponds to the first variable and at least one second transaction value corresponds to the at least one second variable. The questionnaire comprises at least a first question which is associated with the first variable and at least a second question which is associated with the at lest one second variable. When the user answers the at least one second question the answer (in the form of a transaction value) is used in conjunction with the relevance of the first variable to enable or disable the first question.

On generation of the customised documents, the document generation system replaces the first variable with the corresponding first transaction value and replaces the at least one second variable with the at least one second transaction values, and so on. This process may be repeated with any number of other variables.

The web form may comprise at least one page, and where it comprises two or more pages, the first and second questions may be on different pages.

The invention also provides a computer-implemented method of determining the type of each occurrence of the first variable and the relevance of the first variable. A computer program product may be arranged to carry out the steps of the method, or it may be stored on a computer readable medium.

The invention offers the advantage that the web form questionnaire can be made to behave properly in terms of enabling questions when they are relevant and disabling questions when they are not relevant without the need for complex hand encoding each time a variable is included or excluded from the template or customised document.

BRIEF DESCRIPTION OF THE DRAWINGS

The invention will now be described by way of example only, and with reference to the accompanying drawings in which.

DESCRIPTION OF PREFERRED EMBODIMENTS

Figure 2:
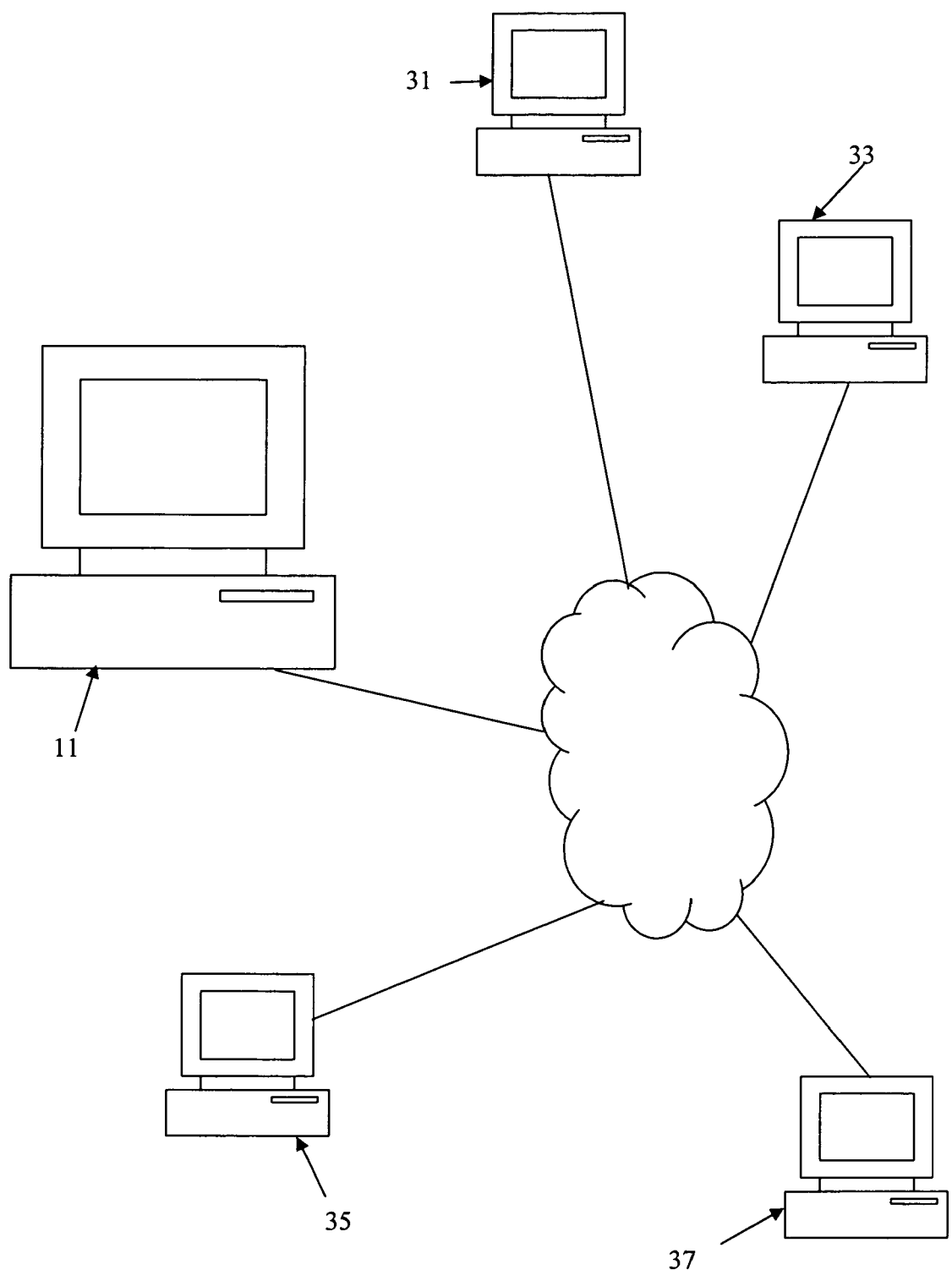
FIG. 2 illustrates a second network system in which embodiments of the invention may be carried out.
Figure 3:
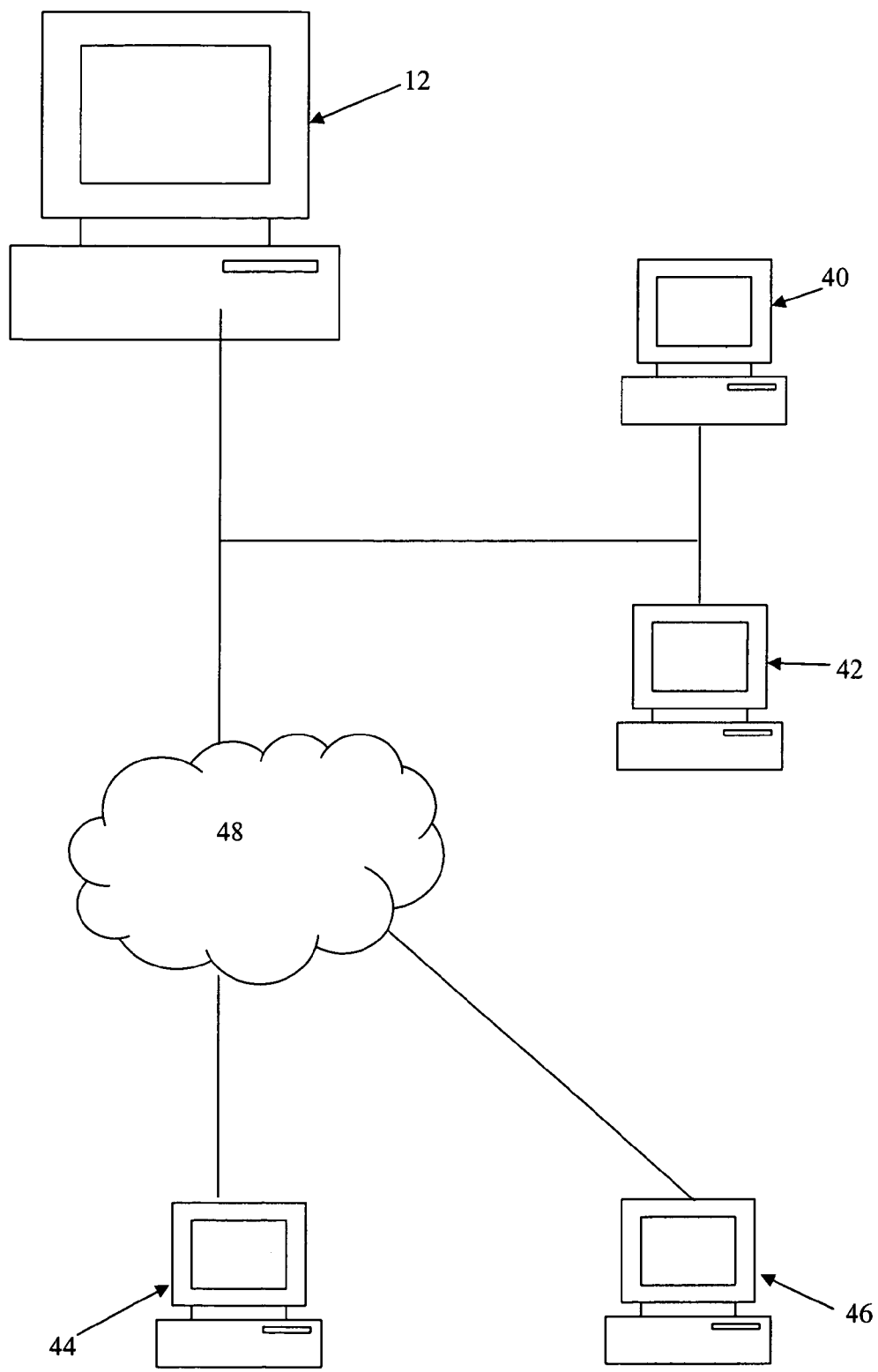
FIG. 3 illustrates a third network system in which embodiments of the invention may be carried out.
Figure 4:
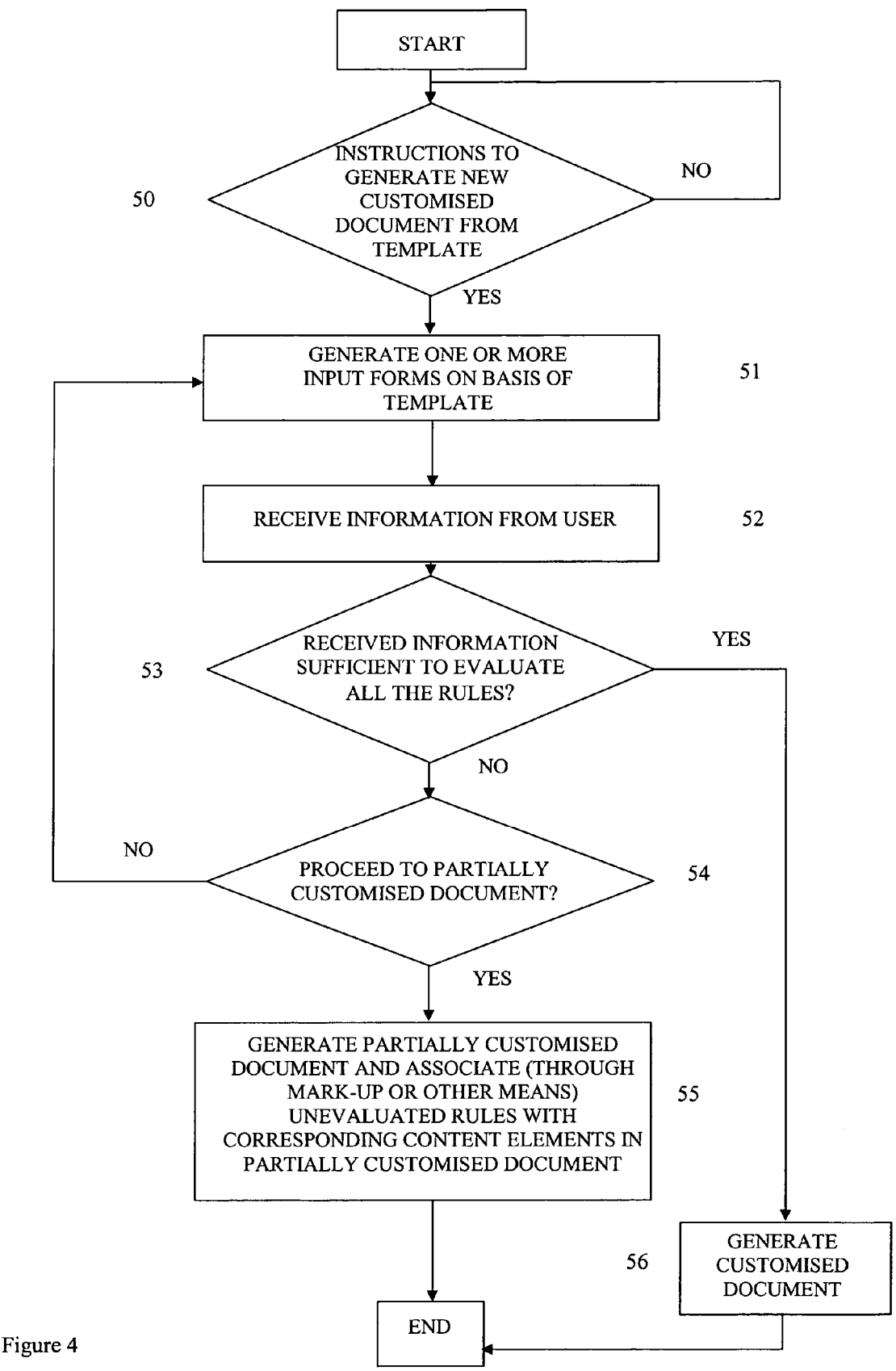
FIG. 4 is a flow diagram showing the stages in producing a customised document.

The system with which embodiments of the present invention are implemented will now be described. The system comprises one or more data processing means, which, where a plurality of processing means are used, are connected together using communication means. For example, client/server architecture may be used, with one of the data processing means functioning as a server, and others as clients. However, a single processing means may function as both server and client. Various configurations of client/server architecture are shown in FIGS. 2, 3 and 4. The invention is not limited to any particular hardware architecture. For example, the invention could be implemented on a stand alone computer such as, for example, a PC.

Figure 1:
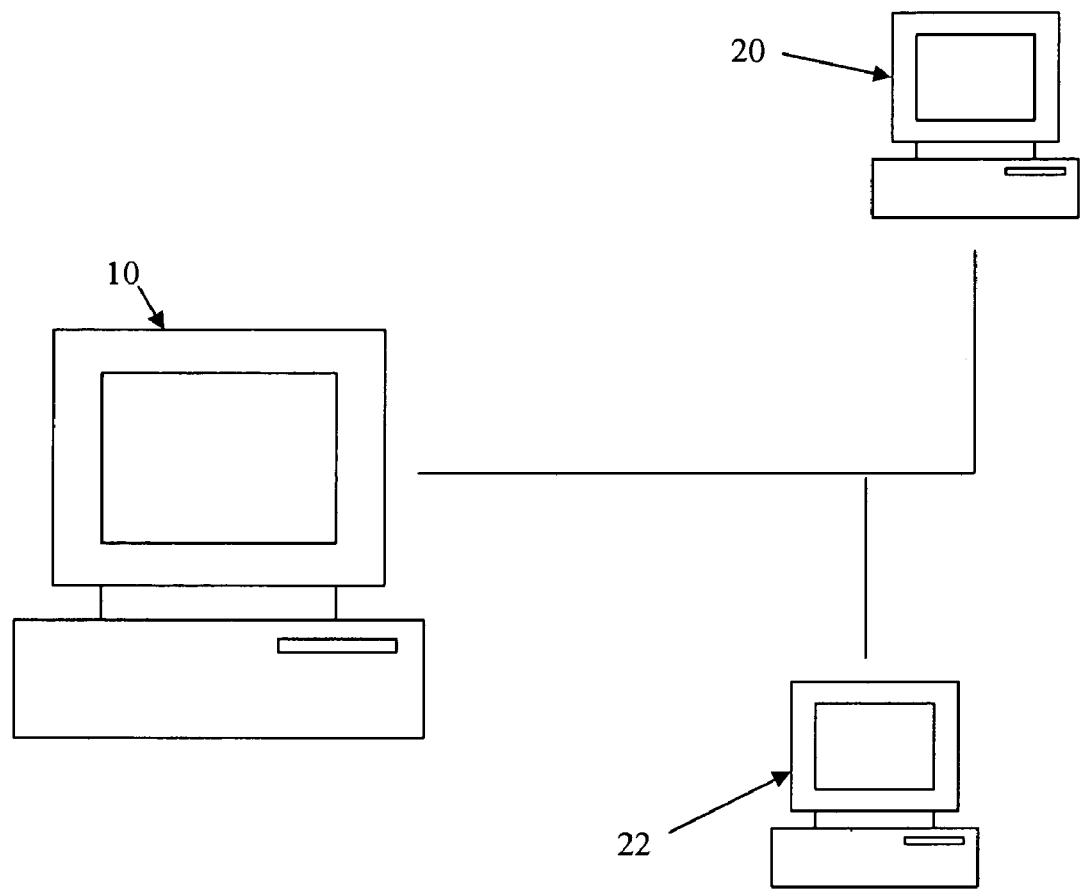
FIG. 1 illustrates a first network system in which embodiments of the invention may be carried out.

FIG. 1 shows a server computer 10 connected to two local client computers 20 and 22, connected by means of a local area network (LAN) 30, forming an intranet. Each computer 10, 20, 22, runs an operating system program, such as Microsoft Windows 2000 Professional™ and network programs such as Novell Netware™. The server computer 10 also runs a Web server application such as Microsoft Internet Information Server™, and each of the local client computers 20, 22 also run a browsing application such as Microsoft Internet Explorer™. The server 10 and local computers 20, 22 communicate using transmission control protocol/internet protocol (TCP/IP) and hypertext transfer protocol (HTTP) or similar.

FIG. 2 shows a single server computer 11 connected to four client computers, 31, 33, 35 and 37, using a LAN, each of which runs the operating systems and browser applications mentioned above, and which communicate with the server computer 10 using TCP/IP and HTTP or similar protocols. It is also possible to use XML or other similar known protocols.

FIG. 3 shows a server computer 12 connected to two local client computers 40 and 42 using a LAN, and also connected to two remote client computers 44 and 46 through the Internet 48. Each runs the operating and browser systems mentioned above, and proxy servers and firewalls may be used to protect the intranet from unauthorised access from the Internet. Again, communication within the intranet is via TCP/IP and HTTP protocols.

As FIG. 3 is the most general arrangement, embodiments of the invention will be described with respect to such a network.

One or more of the computer systems 12, 40, 42, 44 and 46 runs a word processing application such as Microsoft Word™, which is used to create document templates and may be used to view fully or partially customised documents generated by a document generation system. The document template comprises one or more content elements for possible use when generating a customised document and one or more associated rules for determining, on the basis of further information provided by a user, how to use the content elements (which may be conditional clauses or statements) when generating a customised document.

Server computer 12 also runs a document generation program, which, when provided with a template, generates one or more input capture documents to capture information from a user. These documents may be forms, such as web forms, web pages, or any other known computer generated form. The information capture document is generated on the basis of rules contained in the template. The purpose of the information capture document is to enable a user to enter input information. The document generation program then generates a fully or partially customised documents on the instructions of a user. The document generation program may be run as a server program and is instructed to perform tasks by users of client browser applications.

To generate either a fully or partially customised document from a template, a user instructs the document generation program by sending URL GET or POST request from a client computer, 40, 42, 44 or 46, to the server 12. The document generation program then initiates a session with the client computer. The document generation program may generate one or more Web input forms based on the chosen template, which are passed via a Web server application to the client computer. This Web input form uses standard HTML (hypertext mark-up language) features such as buttons, free-form entry boxes, tick boxes, pull-down menu list boxes, radio buttons and other graphical user interface (GUI) means for inputting information. The document generation program may generate multiple information capture documents, for example, input forms, for distributing to and capturing further information from the users of one or more further client computers 40, 42, 44 46. The document generation program may also produce multiple information capture documents as forms for capturing information from the user of a single client computer in several stages. In the remaining description, the information capture document used will be referred to as a form. However, in the following embodiments, it is assumed that only one user of a client computer is involved.

FIG. 4 is a flow diagram showing the process followed by the document generation program. At step 50, the document generation program waits for an instruction from the user to generate a new customised document from a template. On receiving such an instruction, the document generation program generates, at step 51, a first input form on the basis of the rules contained in the template. The user then enters information, using the input form, which is received by the document generation program at step 52. Then, at step 53, the document generation program determines whether the received information is sufficient to evaluate all the rules. If yes, the process continues to step 56 where the document generation program generates a customised document. If no, then the process continues to step 54, where the document generation program determines whether or not it should proceed to generate a partially customised document. If it should, then the process continues to step 55 where such a document is generated. If there is no request from the user to produce a partially customised document (for example, a tick box on the Web input form has been left blank), then the process returns to step 51, and generates further Web input forms for capturing further information from the user. This process is completed until sufficient information is captured to produce either a fully customised document, or a satisfactory partially customised document.

The customised document contains not only the content elements, the inclusion of which has been determined by the various rules within the template, but also the rules which have not been evaluated. The association between the content elements and rules which have not been evaluated may be represented by means of a mark-up.

The content elements may also include conditional elements, which are only included if certain conditions are satisfied. These conditions are known as usage statements.

The information used to generate a partially or fully customised document is captured by means of a web page or a web form, generated by the document generation program. The template from which the document is generated contains various variables, which will be replaced with transaction values provided by the user when the document is generated by the document generation program. This is the case whether the variables are conditional or not. As discussed above, ensuring that the user is prompted for the correct transaction values, and that these are matched correctly with the relevant variables, is problematic.

Embodiments of the present invention solve these problems by considering the relevance of the variables in the template, and using these relevances to generate the web page or web form capturing information.

A simple example of a conditional clause comprising several content elements and variables, in the form it would appear in the template, is shown below: (variables are shown in bold and between curly { } brackets, usage statements are shown in superscript, and conditional text is shown between square [ ] brackets)

{Name}[$^{RegisteredCompany\ OR\ RegisteredCharity}$ whose registered office is at {BusinessAddress}] [$^{NOT(RegisteredCompany\ OR\ RegisteredCharity)}$ of {PrivateAddress}]=('The Supplier')

The variable Name occurs only once within an unconditional part of the clause, and will always appear within a generated document. Therefore, the variable Name is always relevant.

The variable BusinessAddress occurs only once within a conditional part of the clause, and will appear in a generated document only if the corresponding usage statement holds true. Therefore, the variable BusinessAddress is relevant only when the supplier is a registered company or a registered charity.

The variable PrivateAddress occurs only once within a conditional part of the clause, and will appear in a generated document only if the corresponding usage statement holds true. Therefore, the variable PrivateAddress is relevant only when the supplier is not a registered company or a registered charity.

The variable RegisteredCompany occurs twice, each occurrence being part of a usage statement that controls the inclusion of some conditional text. On the first occurrence, the variable RegisteredCompany is only required if the supplier is not a registered charity, since the conditional text will always be included if the supplier is a registered charity. In the second occurrence, the variable RegisteredCompany is again only required if the supplier is not a registered charity, since the conditional text will never be included if the supplier is a registered charity. Therefore, the variable RegisteredCompany is relevant only when the supplier is not a registered charity.

The variable RegisteredCharity occurs twice, each occurrence being part of a usage statement that controls the inclusion of some conditional text. On the first occurrence, the variable RegisteredCharity is only required if the supplier is not a registered company, since the conditional text will always be included if the supplier is a registered company. In the second occurrence, the variable RegisteredCharity is again only required if the supplier is not a registered company, since the conditional text will never be included if the supplier is a registered company. Therefore, the variable RegisteredCharity is relevant only when the supplier is not a registered company.

Consequently, the behaviour of the web page or web form questionnaire can be said to be proper if the questions relating to the variables are enabled or disabled in the following manner:

The Name question is always enabled;

The BusinessAddress question is only enabled when either the RegisteredCompany or the RegisteredCharity questions are enabled, and true;

The PrivateAddress question is only enabled when both the RegisteredCompany and the RegisteredCharity questions are enabled and false;

The RegisteredCompany question is disabled when the RegisteredCharity question is enabled and true; and The RegisteredCharity question is disabled when the RegisteredCompany question is enabled and true.

The relevance of a variable is determined by considering each of its occurrences, and aggregating the dependency statement (type of dependence) of each occurrence using a logical OR operator.

If a variable occurs within unconditional text, then that particular occurrence will always appear in a generated document. The dependency statement of such an occurrence is true, and since true OR anything=true the variable will always be relevant irrespective of any other occurrences.

If a variable occurs within conditional text, such as: [$^{Usage\ Statement}$ ... {Variable} ... ]then the dependency statement of such an occurrence is the usage statement associated with the conditional text.

If the variables occurs nested within other conditionals, as in:

[$^{Usage\ Statement\ 1}$ ... [$^{Usage\ Statement\ 2}$ ... [$^{Usage\ Statement\ N}$ ... {Variable} ... ]]]

then that specific occurrence is dependent upon the conjunction of the logic of each nested usage statement.

If a variable occurs as part of a usage statement that determines the inclusion of conditional text, then the dependency statement includes any other variables also mentioned in that usage statement.

For example, if the logic is:

Statement about Variable1 OR statement about other Variables

Variable1 is only required if the statement about the other variables is false, since the conditional text will definitely be included if the statement about the other variables is true, regardless of the value of Variable1.

For example, if the logic is:

Statement about Variable1 AND statement about other Variables

Then Variable1 is only required if the statement about the other variables is true, since the conditional text will definitely be excluded if the statement about the other variables is false, irrespective of what the value for Variable1 is.

In usage statements that do not involve the logical operators OR or AND, the dependency of the specific occurrences of the variable is said to be true, unless it is nested within other conditional text, as discussed above.

The overall relevance of a variable is the aggregate of all the individual dependency statement for each occurrence of that variable. A variable V that occurs K times within an automated document, the dependency logic for the $k^{th}$ occurrence of V, where $1 \leq k \leq K$ is given by:

dependency $(V_k)$

The relevance of variable V is defined as:

relevant(V)=dependency($V_1$) OR dependency($V_2$) OR . . . dependency($V_k$)

Accordingly, variable V will be enabled on the web page or web form questionnaire if any dependency $(V_k)$ is true, and disabled if they are all false.

From the example given above:
 relevant(Name)=true
 relevant(BusinessAddress)=RegisteredCompany OR RegisteredCharity
 relevant(PrivateAddress)=NOT(RegisteredCompany OR RegisteredCharity)
 relevant(RegisteredCompany)=NOT RegisteredCharity
 relevant(RegisteredCharity)=NOT RegisteredCompany As discussed above, a questionnaire behaves properly if it enables relevant questions, and disables irrelevant questions. This is, however, a static definition of relevance which does not necessarily take into account transactional values that are already known, or which will be captured at the same time.

In a single page questionnaire that contains all the questions for all of the distinct variables in an automated document. For each question on the page, a function can be constructed which controls the enablement and disablement of that question:

```
function able (V)
{
        if      relevant(V)
        then    enable(V)
        else    disable(V)
}
Taking the example given above,
function ableName
{
        document.form0.Name.disabled = false
}
function ableBusinessAddress( )
{
if      (
                document.form0.RegisteredCompany.disabled ==
                false
        &&
                document.form0.RegisteredCompany.checked ==
                true
        ||
                document.form0.RegisteredCharity.disabled ==
                false
        &&
                document.form0.RegisteredCharity.checked == true
        )
        {
                document.form0.BusinessAddress.disabled = false
        }
else    {
                document.form0.BusinessAddress.disabled = true
        }
}
function ablePrivateAddress( )
{
if      (
                document,form0.RegisteredCompany.disabled ==
                false
        &&
                document.form0.RegisteredCompany,checked ==
                false
        ||
                document.form0.RegisteredCharity.disabled ==
                false
        &&
                document.form0.RegisteredCharity.checked == false
        )
        {
                document.form0.PrivateAddress.disabled = false
        }
else    {
                document.form0.PrivateAddress.disabled = true
        }
}
function ableRegisteredCompany( )
{
if      (
                document.form0.RegisteredCharity.disabled ==
                false
        &&
                document.form0.RegisteredCharity.checked == false
        )
        {
                document.form0.RegisteredCompany.disabled =
                false
        }
else    {
                document.form0.RegisteredCompany.checked = true
        }
}
function ableRegistereCharity( )
{
if      (
                document.form0.RegisteredCompany.disabled ==
                false
        &&
                document.form0.RegisteredCompany.checked ==
                false
        )
        {
                document.form0.RegisteredCharity.disabled = false
        }
else    {
                document.form0.RegisteredCharity.checked = true
        }
}
```

However, in a multiple page web page or web form questionnaire, the questions for all of the distinct variables in an automated document may be spread across different pages. The enabling or disabling of questions must therefore also be related to the sequence of the pages, as well as the relevance of the variables.

For example, in the clause above, the business address is only relevant when the supplier is a registered company or a registered charity. Table 1 illustrates how the questions are enabled and disabled for various page sequences:

| Question asked on page number | | | |
|---|---|---|---|
| Registered Company | Registered Charity | Business Address | Enable/Disable |
| 1 | 1 | 2 | The enabling/disabling of registered company and registered charity is as for a single page questionnaire. As both registered company and registered charity will be known from page 1, the business address question on page 2 will be permanently enabled or disabled. |
| 2 | 2 | 1 | As neither registered company nor registered charity will be known until page 2, the business address question on page 1 will be permanently enabled. |
| 1 | 2 | 2 | As registered charity will not be known until page 2, the registered company question on |

-continued

| Question asked on page number | | | |
|---|---|---|---|
| Registered Company | Registered Charity | Business Address | Enable/Disable |
| | | | page 1 will be permanently enabled. As registered company will be known from page 1, the registered charity question on page 2 will be permanently disabled or permanently enabled, depending on the user's answer. If the supplier is a registered company (page 1), then the business address question on page 2 will be permanently enabled. If the supplier is not a registered company (page 1), then the business address on page 2 will be enabled or disabled according to the registered charity question on the same page. |

For a web page or web form questionnaire with P pages, if a variable V occurs on page p, where $1 \leq p \leq P$, then the function which controls the enabling or disabling is given by:

```
function able(V)
{
    if      relevant(V)_p
    then    enable(V)
    else    disable(V)
}
``` where $relevant(V)_p$ is relevant(V) with PAST VALUE and FUTURE VALUE rules. The PAST VALUE rule is where all variables whose questions which appear on pages 1 to p−1 and which were enabled are replaced with transaction values. The FUTURE VALUE rule is one where all statements about variables whose questions appear on pages p+1 to P are replaced with either true (for statements nested within an even number of negations) or false (for statements nested within an odd number of negations).

For example, if the supplier is a registered company, which is determined on page 1, then the relevance of the business address on page 2, using the PAST VALUE rule is:
relevant(BusinessAddress)=true OR RegisteredCharity
which simplifies to:
relevant(BusinessAddress)=true If the supplier is neither a registered company nor a registered charity (again, from page 1), the relevance of the business address, using the PAST VALUE rule is:
relevant(BusinessAddress)=false OR false
which simplifies to:
relevant(BusinessAddress)=false If the supplier is not a registered company, then the relevances of registered charity and business address on page 2, using the PAST VALUE rule are:
relevant(RegisteredCharity)=NOT false
relevant(BusinessAddress)=false OR RegisteredCharity
which simplify to:
relevant(RegisteredCharity)=true
relevant(BusinessAddress)=RegisteredCharity However, if the registered company question and the registered charity question will be asked on page 2, the relevance of the business address on page 1 will be determined using the FUTURE VALUE rule:
relevant(BusinessAddress)=true OR true
which simplifies to:
relevant(BusinessAddress)=true Consequently, once the aggregate and consolidated relevances of the variables have been determined, the PAST VALUE and FUTURE VALUE rules may be associated with these relevances and evaluated by the document generation program to produce a web page or web form questionnaire which behaves properly.

The advantage of using such an approach is that the method of determining relevances and the PAST VALUE and FUTURE VALUE rules may be encoded within the document generation program, and do not require any form of editing when the transaction values change. Embodiments of the invention remove the need to hand encode complex conditional statements or undertake complex editing, which leaves the program code open to error.

Various modifications to the invention, which are within the scope of the appended claims, will be clear to those skilled in the art.

What is claimed is:

1. A system for generating a customised document using a template comprising content elements selected by rules operating on input information, wherein at least one content element comprises at least a first variable, the system further comprising:
   a) means to generate a fully or a partially customised document by evaluating the rules to select some of the content elements;
   b) means to evaluate a set of further rules, the rules including at least one second variable, to determine the number and type of occurrences of the first variable within the template, wherein the further rules determine whether the first variable occurs in the template within unconditional text, conditional text or a usage statement, wherein the further set of rules is evaluated before gathering information from the user for evaluating the rules;
   c) means to aggregate the further set of rules with one another to determine the relevance of the first variable in terms of the at least second variable, wherein the relevance of a variable indicates whether or not a question associated with the variable is to be included in an information capture document or not, wherein the relevance of the first variable in terms of the at least second variable is determined before gathering information from the user for evaluating the rules; and
   d) means to generate an information capture document for obtaining input information from a user based upon at least the determined relevance of the first variable, including means to disable a first question associated with the first variable if the second variable is determined to be irrelevant, wherein the information capture document is generated before gathering information from the user for evaluating the rules.

2. The system of claim 1, wherein the means for generating a fully or partially customised document comprises a document generation program installed on a computer.

3. The system of claim 2, wherein the input information is captured by means of a web form or a web page.

4. The system of claim 3, wherein the web form further comprises at least a second question, wherein the second question is associated with the at least one second variable.

5. The system of claim 4, wherein the user indicates whether the first variable will be included in the generated document.

6. The system of claim 5, wherein the second question is enabled or disabled in the web form based on the determination of the relevance of the first variable and the indication of the user.

7. The system of claim 3, wherein the at least one computer is a server computer, and the web form or web page is generated on a second computer.

8. The system of claim 7, wherein the at least one computer and the second computer are connected by means of a client server network.

9. The system of claim 8, wherein the server client network communicates by means of a communications protocol.

10. The system of claim 9, wherein the communications protocol is at least one of TCP/IP and HTTP.

11. The system of claim 4, wherein the web form comprises at least one page.

12. The system of claim 11, wherein when the web form comprises two or more pages, the first question is a first page, and the second question is on a second page.

13. The system of claim 12, wherein the first page is accessed before the second page.

14. The system of claim 12, wherein the first page is accessed after the second page.

15. The system of claim 2, wherein the at least one computer is part of a server client network.

16. The system of claim 15, wherein the server client network communicates by means of a communications protocol.

17. The system of claim 16, wherein the communications protocol is at least one of TCP/IP and HTTP.

18. The system of claim 15, wherein the at least one computer is a client computer.

19. The system of claim 15, wherein the at least one computer is a server computer.

20. The system of claim 2, wherein the input information comprises at least one transaction value.

21. The system of claim 20, wherein the at least one transaction variable corresponds to the at least one variable.

22. The system of claim 21, wherein, on generation of a partially or fully customised document, the document generation program replaces the at least one variable with the corresponding at least one transaction value.

23. The system of claim 1, wherein the means for aggregating occurrences together uses a logical OR operation.

24. A computer-implemented method of generating an information capture document using external data and received information, the method comprising the steps of:
    accessing a template comprising content elements selected by rules operating on input information, wherein at least one content element comprises at least a first variable;
    prior to gathering information from a user for evaluating the rules, determining the number and type of occurrences of the first variable within the template based on a set of rules including at least one second variable, wherein the set of rules determine whether the first variable occurs in the template with unconditional text, conditional text or a usage statement;
    prior to gathering information from the user for evaluating the rules, determining the relevance of the first variable, in terms of the second variable, based on the number and type of occurrences of the first variable, wherein the relevance of a variable indicates whether or not a question associated with the variable is to be included in an information capture document or not; and
    prior to gathering information from the user for evaluating the rules, generating a web form questionnaire for obtaining input information from the user, based upon at least the determined relevance of the first variable, including disabling a first question associated with the first variable if the second variable is determined to be irrelevant.

25. The computer-implemented method of claim 24, which on accessing the template, further comprises the steps of capturing input information from a user using the web form questionnaire.

26. The computer-implemented method of claim 25, wherein the web form questionnaire further comprises a second question associated with the at least one second variable.

27. The computer-implemented method of claim 26, wherein the user indicates whether the first variable will be included in the generated document or not.

28. The computer-implemented method of claim 27, which, on determining the relevance of the first variable, further comprises the step of enabling or disabling the second question based on the relevance of the first variable and the users indication.

29. The computer-implemented method of claim 24, wherein the step of determining the relevance of the first variable comprises evaluating rules to aggregate the types of occurrences using a logical OR operation.

30. The computer-implemented method of claim 24, wherein the steps of accessing the template, determining the number and type of occurrences of the first variable and determining the relevance of the first variable are carried out by a document generation system.

31. A computer program product comprising a computer readable medium having stored thereon program instructions which when run on a computer causes the computer to perform the steps of:
    accessing a template comprising content elements selected by rules operating on input information, wherein at least one content element comprises at least a first variable;
    prior to gathering information from a user for evaluating the rules, determining the number and type of occurrences of the first variable within the template based on a set of rules including at least one second variable;
    wherein the set of rules determine whether the first variable occurs in the template within unconditional text, conditional text or a usage statement;
    prior to gathering information from the user for evaluating the rules, determining the relevance of the first variable, in terms of the second variable, based on the number and type of occurrences of the first variable, wherein the relevance of a variable indicates whether or not a question associated with the variable is to be included in an information capture document or not; and
    prior to gathering information from the user for evaluating the rules, generating a web form questionnaire for obtaining input information from the user, based upon at least the determined relevance of the first variable, including disabling a first question associated with the first variable if the second variable is determined to be irrelevant.

32. A system for generating a customised document having a template comprising content elements selected by rules operating on input information captured by means of a web form, wherein at least one content element comprises at least a first variable, the system further comprising:
    a) a document generation program installed on a computer to generate a fully or a partially customised document by evaluating the rules to select some of the content elements;
    b) means to evaluate a set of further rules, the rules including at least one second variable, to determine the number and type of the currencies of the first variable, within the template, wherein the further rules determine whether the first variable occurs in the template within unconditional text, conditional text or a usage statement, wherein the further set of rules is evaluated before gathering information from the user for evaluating the rules;

c) means to aggregate the further set of rules with one another to determine the relevance of the first variable in terms of the at least second variable wherein the relevance of a variable indicates whether or not a question associated with the variable is to be included in an information capture document or not, wherein the relevance of the first variable in terms of the at least second variable is determined before gathering information from the user for evaluating the rules; and d) means to generate a web form for obtaining input information from a user, based upon at least the determined relevance of the first variable, wherein the web form comprises at least a first question associated with the first variable and a second question associated with the at least one second variable, and wherein a first question associated with the first variable is disabled if the second variable is determined to be irrelevant, wherein the web form is generated before gathering information from the user for evaluating the rules.

33. An information capture document for use with the document generation system of claim 1.

34. An information capture document for use with the document generation system of claim 32.

* * * * *